UNITED STATES PATENT OFFICE.

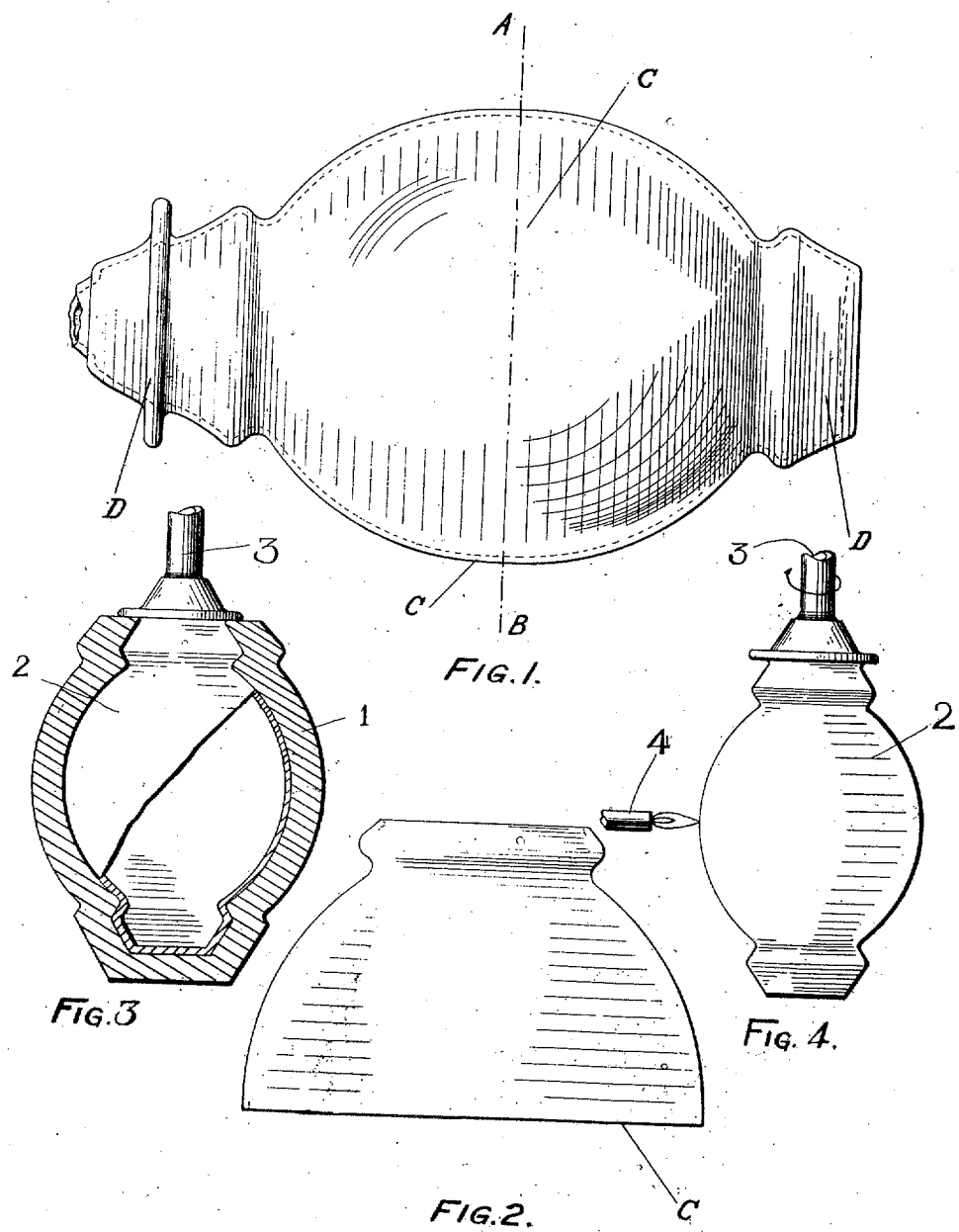

EDGAR A. GILLINDER, OF TACONY, PENNSYLVANIA.

PROCESS OF MANUFACTURING GLASSWARE.

986,380.

Specification of Letters Patent. Patented Mar. 7, 1911.

Application filed March 28, 1908. Serial No. 423,960.

*To all whom it may concern:*

Be it known that I, EDGAR A. GILLINDER, a citizen of the United States, residing at Tacony, in the county of Philadelphia and State of Pennsylvania, have invented a certain new and useful Process of Manufacturing Glassware, of which the following is a specification.

The principal object of the present invention, is to provide for facilitating the production and cheapening the manufacture of a variety of glass articles, such as can be blown two at a time in a mold and afterward separated and finished, an example of which is shades.

To this and other ends hereinafter set forth the invention stated in general terms comprises blowing two articles in a mold, while the articles are plastic separating them, while still plastic subjecting the appropriate parts of each of the articles to fire-polishing and if desired, shaping, and finally annealing the finished articles; the steps of blowing, separating and fire-polishing being performed while the articles are plastic or hot from a single heat and the annealing being thereafter accomplished.

The accompanying drawings are illustrative of the process and in them, Figure 1, illustrates the two articles as they are blown in the mold, Fig. 2, is a view of one of the articles after it has been separated. Fig. 3, is a view illustrating diagrammatically means for making the product in a mold, and Fig. 4, illustrates means for separating the product into two articles.

Without confining the invention to the practice of the process for the production of any special articles of glass, I will describe the process in connection with the manufacture of shades and with relation to the accompanying drawings.

In the ordinary and well understood manner two shades connected together, or perhaps more accurately speaking, a form or product capable of being made into two shades, are or is, blown in a mold. In Fig. 3, is illustrated a mold 1, which is made in two parts so as to be separated in the ordinary and well understood way and in which the product 2, is made by means of the ordinary rod 3, which is manipulated and blown through by the workmen in the ordinary way. This product is, of course, hot due to the heat of the glass from which it was blown. While still retaining this heat and plastic this product, which is indicated in Fig. 1, is severed as along the line A—B, for example, by means of a flame, or some other appropriate means for accomplishing this result, as for example, by effecting an appropriate temperature change. Fig. 4, illustrates a blow pipe 4, by means of which heat is applied to the product 2, as it is rotated, for example, by rotating the rod 3. The blow pipe heats a ring around the product hotter than the rest of it so that upon cooling somewhat the contraction is uneven so that the article can be readily severed as along the line A—B. If necessary the article may be tapped to assist in its severance or it may be somewhat chilled as by a blast of air. In some instances the rims C, of the separated articles are to be shaped, for example, crimped or otherwise ornamented and this can be done at this time and while the articles still retain their initial heat and are plastic. Thereupon and while the articles are still hot and plastic and retain their initial heat the rims C, which may or may not have been previously shaped, are fire-polished in the ordinary manner and thereupon the articles are annealed, so that they have been blown in a mold, separated, shaped, if required, and fire polished while they remained in the condition incident to their initial and single heating, so that after annealing none of these operations have to be performed and the articles do not have to be reheated, thus their production is cheapened and facilitated. After annealing in the case of the articles illustrated, the portions D, are removed and the rims left by their removal may be ground or permitted to remain as they are since the finish of these rims in this particular article is not important.

What I claim is:

1. The process of making glass articles which consists in blowing in a mold a glass product capable upon separation of making two of the articles, while still hot and plastic from its initial heat separating this product into two articles, while the articles are still hot and plastic from the initial heat fire-polishing the same, and finally annealing the articles, substantially as described.

2. The process of making glass articles which consists in blowing in a mold a glass product capable upon separation of making two of the articles, while still hot and plastic from its initial heat separating this product into two articles and shaping the same, while the articles are still hot and plastic from the initial heat fire-polishing the same, and finally annealing the articles, substantially as described.

In testimony whereof I have hereunto signed my name.

EDGAR A. GILLINDER.

Witnesses:
CLIFFORD K. CASSEL,
K. M. GILLIGAN.